United States Patent [19]

Micek

[11] Patent Number: 4,932,444
[45] Date of Patent: Jun. 12, 1990

[54] FILL NECK ASSEMBLY FOR VEHICLE MOUNTED FUEL VAPOR RECOVERY SYSTEM

[75] Inventor: Dennis Micek, Dearborn, Mich.
[73] Assignee: Colt Industries Inc., New York, N.Y.
[21] Appl. No.: 109,712
[22] Filed: Oct. 19, 1987
[51] Int. Cl.⁵ .................................. B65B 31/06
[52] U.S. Cl. ............................. 141/59; 141/44; 141/286; 141/291; 141/302; 137/588; 220/85 VR; 220/85 VS; 220/86 R; 220/DIG. 33; 55/387; 123/519
[58] Field of Search ............... 220/85 R, 86 R, 85 VS, 220/85 VR, 85 F, DIG. 33; 137/386–389; 127/517; 141/44, 45, 59, 291, 292, 293, 294, 301, 307, 286; 55/168, 387

[56] References Cited

U.S. PATENT DOCUMENTS

| | | | |
|---|---|---|---|
| 4,564,054 | 1/1986 | Gustavsson | 141/329 |
| 4,630,749 | 12/1986 | Armstrong et al. | 220/86 R |
| 4,706,708 | 11/1987 | Fornuto et al. | 141/59 X |
| 4,707,164 | 11/1987 | Harris | 141/286 X |
| 4,714,172 | 12/1987 | Morris | 220/86 R |
| 4,715,509 | 12/1987 | Ito et al. | 220/86 R |
| 4,724,861 | 2/1988 | Covert et al. | 220/86 R |
| 4,742,809 | 5/1988 | Ito et al. | 220/85 VR |
| 4,747,508 | 5/1988 | Sherwood | 220/86 R |

*Primary Examiner*—Ernest G. Cusick
*Attorney, Agent, or Firm*—Howard S. Reiter

[57] ABSTRACT

An onboard fuel vapor recovery system for a motor vehicle includes a fill neck assembly mounted at the inlet end of a dual passage fuel tank fill pipe in which fuel dispensed into the fuel tank during a refueling operation passes through an inner conduit while fuel vapor displaced from the tank by incoming fuel passes upwardly through a vapor passage between the inner conduit and an outer conduit loosely surrounding the inner conduit, the fill neck assembly including a vapor valve movable to an open position in response to unsealing of the inlet to the inner conduit in preparation for a refueling operation, opening of the vapor valve permitting fuel vapor displaced from the tank during the refueling operation to flow into a vapor receiving canister from which the vapor is subsequently withdrawn for combustion in the vehicle engine, the fill neck assembly also including a float valve for signalling the filling of the tank to capacity and a pressure relief valve in the fill neck assembly protecting the system in emergency overfilling situations.

14 Claims, 2 Drawing Sheets

FILL NECK ASSEMBLY FOR VEHICLE MOUNTED FUEL VAPOR RECOVERY SYSTEM

BACKGROUND OF THE INVENTION

The Environmental Protection Agency has been expressing increased concern with the problems resulting from the discharge of fuel vapor from motor vehicles into the atmosphere. At the present time, there are available fuel vapor recovery systems incorporated in the fuel tank vent which typically involve a storage canister which traps vapor which would otherwise be discharged from the tank vent. During operation of the vehicle engine, vapor from the canister is withdrawn from the canister into the engine intake manifold for combustion in the engine.

While such systems minimize the escape of vapor from the tank during normal vehicle operation, they are totally inadequate to cope with the massive surge of fuel vapor displaced from the fuel tank during a refueling operation. To minimize escape of vapor through the vent, these systems invariably employ relatively restricted flow passages which cannot provide adequate venting of the tank head space while the tank is being filled from a service station pump. As a result, even with such systems in place in the vehicle, nearly all of the fuel vapor displaced from the tank during the refueling operation is vented into atmosphere through the fuel tank filler pipe.

It has been proposed to recover fuel vapor displaced from the fuel tank during the refueling operation by a system employing a relatively large vapor receiving canister mounted in the vehicle which is placed in communication with the head space of the fuel tank only during the refueling operation. Such systems permit fuel vapor to be displaced from the tank at a rate of flow which will permit rapid filling of the tank with incoming fuel and will permit the use of a sliding seal between the fill pipe and the standard fuel dispensing nozzle so that the fill pipe is sealed against the discharge of fuel vapor while the tank is being filled. The canister employed by such a system may be connected to the intake manifold in the manner described above so that vapor may be withdrawn for combustion in the engine during operation of the engine.

In present day vehicles, space for mounting the components of a refueling vapor recovery system is limited and the location of available space can vary widely between different makes and models of vehicles. The system, because of the present trend to self service station pumps should be automatically operable and the active parts of the system-that is valves, valve operators, etc. should preferably be contained in a single package conformed to available space on the vehicle so that the package may be mounted at a location which is reasonably accessible for purposes of inspection, repair or replacement.

The present invention is directed to fill neck assemblies which may be coupled to a dual passage tank fill pipe to conduct vapor displaced from the tank during a refilling operation to a remotely located refueling vapor canister.

SUMMARY OF THE INVENTION

Two forms of fill neck assemblies embodying the present invention are disclosed. Both fill neck assemblies are formed at their lower ends to be received upon a dual passage filler pipe in which an inner hose extends freely through the interior of a larger diameter outer hose to provide an inner passage through which liquid can flow into the fuel tank and an outer passage through which fuel vapor displaced from the tank during a refueling operation may flow into a passage in the fill neck assembly. Within each fill neck assembly, the inlet to the fuel carrying passage is constituted by an opening through an annular seal dimensioned to slidably and sealingly engage the outer surface of the standard tubular fuel dispensing nozzle of a service station fuel pump. This seal prevents the discharge of vapor through the inlet of the fill neck assembly during a refueling operation. At all other times, this inlet is closed by a closure cap at the fill neck inlet.

The vapor passage in the fill neck assembly is in each case isolated from the fill passage and communicates through the fill neck housing with an outlet connected to the refueling vapor canister which is normally closed by a vapor control valve.

In one form of the invention the vapor valve is spring biassed toward an open position, but is held in a closed position when the closure cap is in place by means of a valve actuating rod engaged by the closure cap. When the closure cap is removed so that the pump nozzle can be inserted into the inlet, removal of the cap releases the valve actuating rod to permit the vapor valve to move to its open position.

An alternate embodiment of the invention employs the trap door in the fill pipe inlet to actuate the vapor valve. The trap door is formed with a pinion which engages a rack which mechanically shifts the vapor valve to its open position upon the insertion of a nozzle through the annular seal, insertion of the nozzle pivoting the trap door clear of the seal.

In each case, the vapor passage through the fill neck assembly incorporates a normally open float valve which will be floated upwardly to a closed position to block flow to the vapor valve when liquid fuel backs up in the vapor passage when the fuel tank is filled to capacity. A loosely packed or coarsely porous material is disposed within the fill neck assembly to retard the rise of fuel in the vapor passage so that liquid fuel can rise in the fuel passage to actuate the automatic fuel nozzle shutoff incorporated in the fuel dispensing nozzle before the liquid level in the vapor passage reaches the float.

In the event the automatic nozzle shutoff should malfunction, both forms of the invention incorporate a pressure relief valve which will open to allow fuel backing up in the fill pipe to bypass the nozzle seal and spill from the fill housing inlet before the fuel tank is over pressurized.

Other objects and features of the invention will become apparent by reference to the following specification and to the drawings.

DESCRIPTION OF THE PREFERRED EMBODIMENTS

Figure 1:
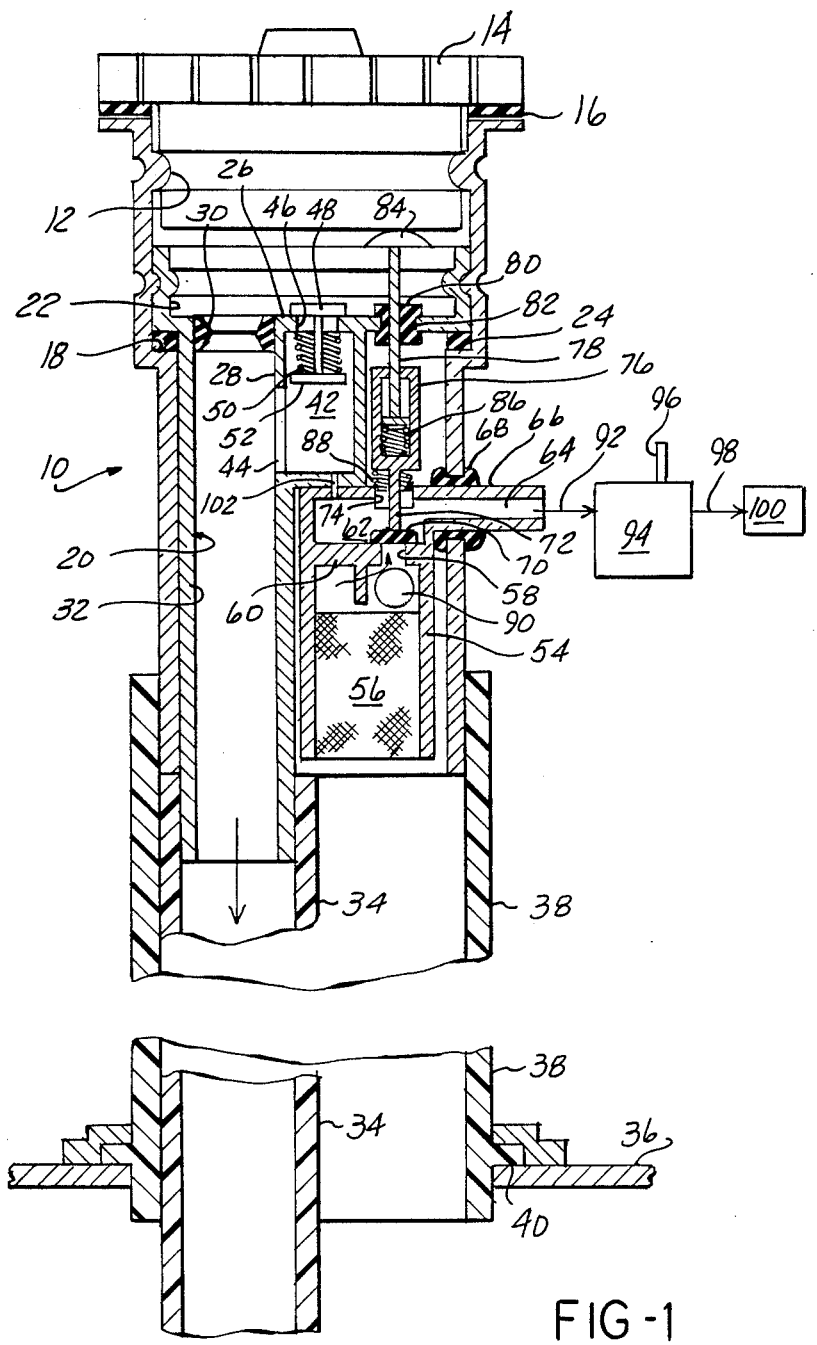
FIG. 1 is a detail cross-sectional view taken on a vertical plane through one form of fill neck assembly embodying the present invention.

In the embodiment of FIG. 1, a fill neck assembly embodying the present invention includes a tubular outer housing designated generally 10 which is internally threaded at its upper end as at 12 to threadably receive a closure cap 14 which, when in place, sealingly closes the upper end of housing 10 at an annular seal 16.

The interior of housing 10 is formed with an annular upwardly facing radial shoulder 18. An inner housing designated generally 20 is mounted in the interior of outer housing 10 and is formed with a cup-shaped upper end portion 22 dimensioned to be sealingly seated upon radial shoulder 18 and sealed to the shoulder as by an o-ring 24. The bottom wall 26 of the cup-shaped upper portion 22 is formed with an inlet passage 28 extending through the wall. A resilient annular seal 30 is fixedly mounted in the upper end of this passage and is formed with an internal diameter dimensioned to slidably and sealingly receive the tubular fuel dispensing nozzle of a service station pump, these nozzles being made to a standard outer diameter.

Inner housing 20 is formed with a downwardly projecting tubular extension 32 of passage 20 open at its lower end and adapted to be sealingly received upon the upper end of a conduit 34 which extends downwardly into the interior of a vehicle fuel tank partially indicated at 36. Conduit 34 passes through the interior of a larger diameter conduit 38 which sealingly receives the lower end of main housing 10 in its upper end and opens at its lower end into the interior of fuel tank 36 through a tank seal indicated at 40.

At one side of inlet passage 28 below bottom wall 26, an internal chamber 42 is formed in inner housing 20 which communicates with inlet passage 28, via an opening 44. A passage 46 extending from the upper end of chamber 42 through bottom wall 26 is normally closed by a valve head 48 biased downwardly against the top of bottom wall 26 by a spring 50 engaged with a plate 52 fixedly secured to valve head 48.

A third housing 54 is mounted within outer housing 10 to define a passage 56 opening near the bottom of housing 10 and extending upwardly through the housing to communicate at its upper end with a relatively small diameter passage 58 extending upwardly through an internal wall 60 within housing 54. The lower portion of passage 56 is filled with a loosely packed or coarsely porous material 59 which presents a relatively small resistance to the flow of vapor but presents a greater resistance to the flow of liquid fuel through passage 56. A float ball 90 rests on the top of material 59. A chamber 62 is formed within housing 54 above wall 60 and communicates with an outlet passage 64 extending through a hose coupling 66 which projects to the exterior of housing 10 via a sealed bore 68.

Passage 58 is normally closed at its upper end by a valve head 70. A valve stem 72 is fixedly secured to valve head 70 and projects vertically upwardly through an opening 74 through the top of housing 54. The upper end of valve stem 72 is formed with a vertically elongate hollow enlarged section 76 which slidably receives a valve actuator 78 which projects upwardly through a sliding seal 80 mounted in an opening 82 through bottom wall 26. A head 84 at the upper end of actuator 78 is located to be engaged and depressed by closure cap 14 when cap 14 is in the illustrated closed position of FIG. 1. Actuator 78 is biased upwardly relative to valve stem 72 by a compression spring 86, while valve stem 72 is in turn resiliently biased upwardly by a compression spring 88 engaged beneath the enlarged portion 76 of valve stem 72 and the top of housing 54.

Outlet passage 64 is connected via a conduit schematically indicated at 92 directly to a refueling vapor canister 94 which may be vented to atmosphere as by a vent 96. A conduit 98 connects an outlet of canister 94 to a vapor disposal system schematically indicated at 100 which permits fuel vapor withdrawn from canister 94 to flow to the intake manifold of the vehicle engine for combustion by the engine. Typically, the system indicated at 100 will include a computer controlled purge valve and a regulator valve which act in response to engine operating conditions and manifold pressure to limit the rate of flow of vapor from canister 94 to the engine to a rate low enough to assure combustion of all of the vapor so transferred to the engine.

The fill neck assembly of FIG. 1 typically will be mounted within a well formed in the rear fender of the vehicle, and the mounting means, not shown, preferably will be so designed as to permit reasonable access enabling removal of the fill neck assembly as a unit.

During normal operation of the vehicle, the various valves in the fill neck are maintained in the position shown in FIG. 1.

When the vehicle is to be refueled, the first step in the refueling operation is the removal of closure cap 14 from the fill neck assembly. Removal of cap 14 permits actuator 78 to move upwardly relative to the valve stem 72 by extension of compression spring 86, and this release of the downward biassing action of spring 86 against valve stem 72 in turn permits spring 88 to elevate the valve stem, lifting valve head 70 clear of passage 58.

The fuel dispensing nozzle of the service station pump is then inserted downwardly through annular seal 30 and fuel dispensed from the nozzle passes downwardly through inlet passage 28, 32 and through the inner conduit 34 into the interior of fuel tank 36. The incoming fuel displace fuel vapor from the head space of the tank upwardly through the passage defined between the inner conduit 34 and outer conduit 38, and this vapor flows upwardly through the flow retarding material 59, through passage 58 into chamber 62 and thence via outlet 64 and conduit 92 to the refueling vapor canister 94.

When fuel tank 36 is completely filled, the incoming fuel rises both within conduit 34 and the passage between conduit 34 and conduit 38. Present day fuel dispensing nozzles are almost universally equipped with an automatic shutoff device which is actuated when fuel backing up in the fill pipe reaches the nozzle. In the system of FIG. 1, the material 59 retards the upward flow of fuel from the passage between conduits 34 and 38 so that fuel rising within conduit 34 will normally trigger the nozzle shutoff device before fuel flowing upwardly through housing 54 reaches passage 58. If, due to a delay or malfunction of the nozzle shutoff device, fuel rising within housing 54 rises to the level of float ball 90, ball 90 will float on the rising fuel and block the lower entrance to passage 58 to prevent fuel from flowing upwardly through this passage, even though valve head 70 is, at this time, lifted clear of its seat.

Buildup of vapor pressure within inlet passage 28, 32 which might retard the rate at which fuel rises within this passage is vented into chamber 62 via a vent passage 102.

In the event an unnoticed malfunction of the automatic nozzle shutoff device should occur and fuel should continue to flow into the already filled system, the rise of pressure within the system will open pressure relief valve 48 to permit fuel to spill from the open upper end of the fill neck assembly to draw attention to the malfunction.

Figure 2:
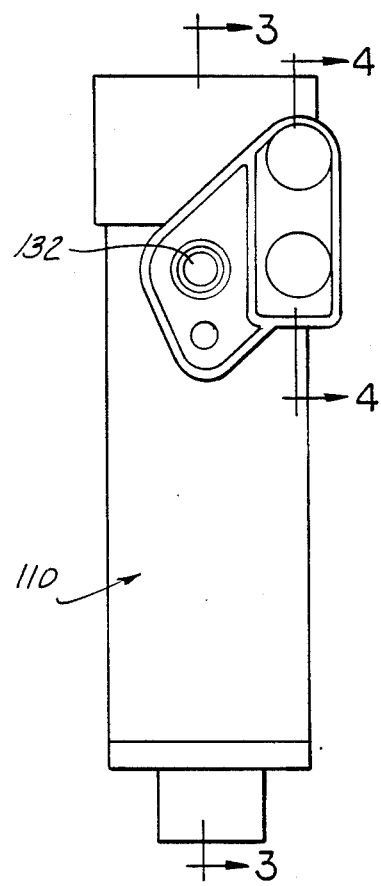
FIG. 2 is a side elevational view of a second form of fill neck assembly embodying the present invention.
Figure 3:
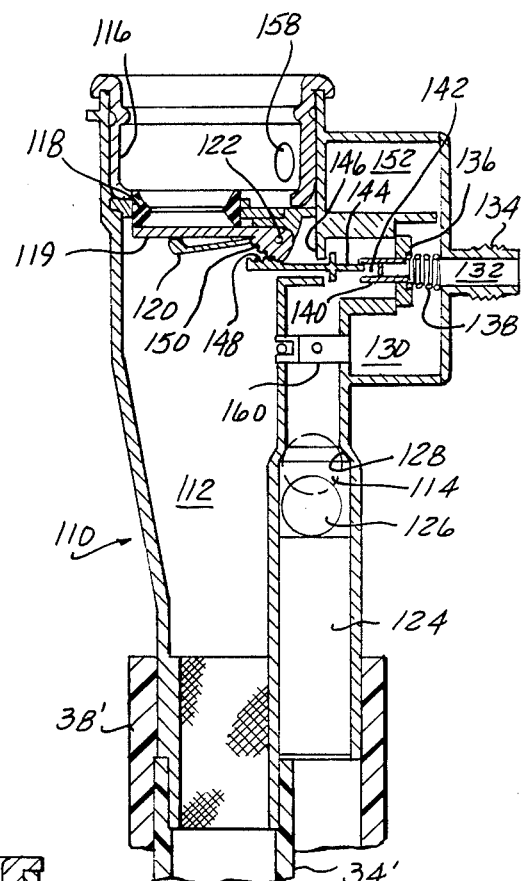
FIG. 3 is a detail cross-sectional view taken on line 3—3 of FIG. 2.
Figure 4:
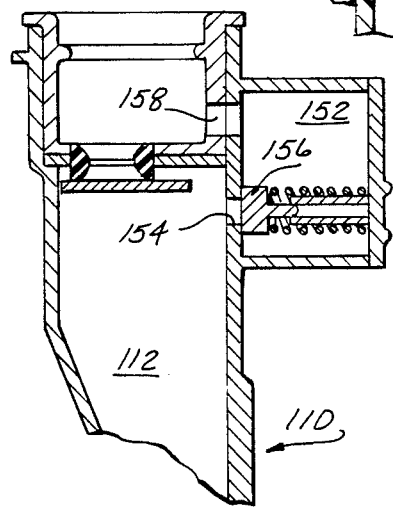
FIG. 4 is a detail cross-sectional view taken on line 4—4 of FIG. 2.

In the fill neck assembly of FIGS. 2-4, the fill neck is formed with a generally tubular housing designated generally 110 formed with separate internal passages 112, 114 adapted to open at their lower ends into inner 34' and outer 38' conduits leading to the vehicle fuel tank in the same manner as the conduits 34 and 38 of the FIG. 1 embodiment. A cup-shaped insert 116 fixedly mounted in the upper end of passage 112 receives an annular seal 118 in an opening through its bottom wall, the seal 118, as in the embodiment of FIG. 1, being dimensioned to slidably and sealingly receive a standard fuel dispensing nozzle. The passage through seal 118 is normally closed at its underside by a hinged plate-like trap door valve 119 resiliently biassed to the closed position shown in FIG. 3 as by a torsion spring 120. The trap door valve 119 is hingedly mounted as by a hinge pin 122 on the underside of insert 116.

The lower end of passage 114 is filled with some form of loosely packed or coarsely porous material 124 which will present a minimum amount of resistance to flow of vapor, but will present a substantially greater resistance to the flow of liquid fuel. A float ball 126 rests upon the top of material 124 and is normally spaced below a downwardly facing shoulder 128 in the upper end of passage 114 which opens into a chamber 129 which in turn opens into a somewhat larger chamber 130 communicating with an outlet passage 132 through a hose coupling 134 at the exterior of the fill neck assembly. A valve head 136 is normally biassed to the closed position shown in FIG. 3 to block fluid communication between chambers 128 and 130 as by a spring 138.

A valve stem 140 is fixedly secured to valve head 136 and projects from head 136 into chamber 128. A recess 142 in the left-hand end of stem 140 as viewed in FIG. 3 slidably receives one end of a valve actuator 144 mounted for horizontal sliding movement within an internal wall 146 of housing 110. The opposite end of actuator 144 is formed with a series of rack teeth 148 which are meshed with a pinion gear segment 150 fixedly mounted upon trap door valve 119. When trap door valve 119 and valve 136 are in the closed positions shown in FIG. 3, the right-hand end of valve actuator 144 is spaced somewhat at 145 from the bottom of recess 142, this last motion spacing 145 enabling valves 118 and 136 to independently move to their fully closed position.

A bypass chamber 152 is also formed within housing 110. Chamber 152 can be placed in communication with passage 112, see FIG. 4, via a passage 154 which is normally closed by a spring loaded valve head 156, this arrangement corresponding to the pressure relief valve 48 of the FIG. 1 embodiment. Chamber 152 opens into insert 116 via a passage 158 through the walls of insert 116 and housing 110.

As in the previously described embodiment, outlet passage 132 is connected via a conduit coupled to hose coupling 134 to a refueling vapor canister. The open upper end of the fill neck assembly of FIGS. 2-4 is normally closed by a conventional closure cap, not shown.

Operation of the fill neck assembly of FIGS. 2-4 is as follows.

A refueling operation is initiated by inserting a standard fuel dispensing nozzle axially downwardly through annular seal 118. As the nozzle is pushed downwardly through seal 118, the end of the nozzle engages the trap door valve 119, and further downward movement of the nozzle hinges the trap door in a counterclockwise direction about its hinge pin 122 as viewed in FIG. 3. The meshed engagement between the pinion gear segment 150 on trap door valve 119 with rack 148 on the actuator translates this counterclockwise hinging of trap door valve 119 into rightward movement of valve actuator 144 as viewed in FIG. 3. When actuator 144 has been moved to the right from the FIG. 3 position a lost motion distance sufficient to engage its right-hand end with the bottom of recess 142, further rightward movement of actuator 144 will push valve head 136 to the right as viewed in FIG. 3 to place chambers 128 and 130 in communication with each other.

As in the previous case, flow of fuel from the dispensing nozzle downwardly through passage 112 and into the fuel tank will displace vapor from the head space of the tank and this vapor will flow upwardly through the space between conduits 34 and 38, through the baffle material 124 past ball 126 upwardly through passage 114 into chamber 128, past the open valve 136 and outwardly through passage 132 to the refueling vapor canister.

As in the previous case, when the tank is filled, fuel will rise from the tank into passages 112 and 114 and the rising fuel in passage 112 will, in the normal course of events, trigger the automatic nozzle shutoff to shut off the flow of incoming fuel. In the event the nozzle shutoff does not occur before fuel in passage 114 rises to shoulder 128, the float ball 126 will be lifted by the rising fuel in passage 114 to seat against shoulder 128 to block the rising fuel from flowing upwardly into chamber 130. Fuel vapor pressure in passage 112 above the rising fuel may be vented into chamber 130 via a relatively restricted vent passage through element 160.

As in the previous case, in the event of a fuel nozzle shutoff malfunction, liquid fuel rising in passage 112 will eventually open the pressure relief valve 156 to permit fuel to spill from the open end of the fill pipe assembly via passage 154, chamber 152 and passage 158.

While two embodiments of the invention have been described in detail, it will be apparent to those skilled in the art the disclosed embodiments may be modified. Therefore, the foregoing description is to be considered exemplary rather than limiting, and the true scope of the invention is that defined in the following claims.

I claim:

1. The combination of a vehicle fuel tank having an outer tubular conduit extending upwardly from the top of said tank and an inner tubular conduit extending freely through said outer conduit, both of said conduits opening at their lower ends into the interior of said tank, and a fill neck assembly comprising a housing having an inlet opening and a lower end adapted to be sealingly connected to the upper end of said outer conduit, means including a hollow tubular member on the lower end of said housing adapted to be sealingly connected to the upper end of said inner conduit to define a first passage extending upwardly through said housing to said inlet opening, sealing means for normally sealing said inlet opening and movable to an open position to accommodate the introduction of liquid fuel into said first passage through said inlet opening, means defining a second passage through said housing having an inlet at its lower end adapted to open into the upper end of said outer conduit and an outlet at one side of said housing, said first and second passages being isolated from uncontrolled communication with one another at said housing, normally closed first valve means operable in a first position to block flow of fluid through said second passage and shiftable to a second position placing said inlet and said outlet of said second passage in fluid communication with each other, and means responsive to movement of said sealing means to its open position for shifting said first valve means to its second position.

2. The invention defined in claim 1 further comprising normally open float valve means in said second passage between the tank and said first valve means movable to a closed position blocking fluid communication between said second passage inlet and said first valve means in response to the presence of a predetermined level of liquid fuel in said second passage.

3. The invention defined in claim 1 or claim 2 further comprising means for venting fuel vapor from said first passage to the outlet of said second passage.

4. The invention defined in claim 1 further comprising means defining an annular seal adjacent the upper end of said first passage adapted to slidably and sealingly receive a tubular fuel dispensing nozzle of standard diameter to accommodate the dispensing of liquid fuel from said nozzle into said first passage while maintaining said first passage sealed from the atmosphere, and bypass valve means for venting said first passage to the atmosphere when the pressure in said first passage exceeds a predetermined pressure.

5. The invention defined in claim 1 wherein said sealing means comprises a closure cap threadably and detachably received upon the upper end of said housing for axial movement relative to said housing to and from a closed position wherein said cap seals said inlet opening of said first passage from the atmosphere, and said first valve means comprises a valve member movable between said first position wherein said valve member is in seated engagement with a valve seat and said second position wherein said valve member is clear of said seat, and spring means engageable between said valve member and said cap to resiliently bias said valve member to said first position when said cap is in said closed position and to bias said valve member to said second position when said cap is detached from said housing.

6. The invention defined in claim 5 wherein said valve member comprises a valve head movable between said first and second positions along a path parallel to the direction of threaded movement of said cap upon said housing;
   a valve stem fixedly secured at one end to said valve head;
   an elongate actuator slidably received at one end in said valve stem for longitudinal sliding movement relative to said valve head;
   abutment means at the other end of said stem engagable with the inner side of said cap;
   first compressible spring means engaged between said valve stem and said housing biassing said valve stem and said valve head toward said second position; and
   second compressible spring means engagable between said valve stem and said actuator operable to overcome the biassing action of said first compressible spring means and to bias said valve stem and said valve head to said first position when said cap is in said closed position.

7. The invention defined in claim 5 further comprising flow retarding means in said second passage between said inlet and said first valve means, and normally open float valve means in said second passage between said flow retarding means and said first valve means for blocking communication between said inlet and said first valve means when the level of liquid in said second passage rises above said flow retarding means.

8. The invention defined in claim 5 further comprising means defining an annular seal adjacent the upper end of said first passage adapted to slidably and sealingly receive a tubular fuel dispensing nozzle of standard diameter to accommodate the dispensing of liquid fuel from said nozzle into said first passage while maintaining said first passage sealed from the atmosphere, and bypass valve means for venting said first passage to the atmosphere when the pressure in said first passage exceeds a predetermined pressure.

9. The invention defined in claim 1 wherein said sealing means comprising annular seal means mounted in said housing between said inlet opening and said first passage adapted to slidably and sealingly receive a tubular fuel dispensing nozzle of standard diameter to accommodate the dispensing of liquid fuel from said nozzle into said first passage while maintaining said first passage sealed from the atmosphere, a hinged trap door plate mounted in said first passage adjacent said annular seal means for pivotal movement between a closed position in underlying sealing engagement with said annular seal means sealing said first passage from said inlet opening and an open position clear of said annular seal means, spring means biassing said plate to said closed position, said plate adopted to be movable to its open position by the insertion of said nozzle through said annular seal means, and lost motion coupling means coupling said plate to said first valve means for shifting said first valve means to its second position upon pivotal movement of said plate to its open position.

10. The invention defined in claim 9 further comprising bypass valve means in said housing for venting said first passage to the atmosphere when the pressure in said first passage exceeds a predetermined pressure.

11. The invention defined in claim 9 further comprising means for venting fuel vapor from said first passage to the outlet of said second passage.

12. The combination recited in claim 1, wherein said first and second passages are formed and disposed in a parallel, side-by-side manner so as to be conveniently connectable to said inner and outer conduits, respectively.

13. The combination recited in claim 1, wherein a continuously open but restricted vent by-passing said first valve provides controlled communication between said first and second passages, in addition to said first valve means, for venting fuel vapor pressure above the rising fuel in said first passage to said second passage outlet.

14. For use in combination with a vehicle fuel tank having an outer tubular conduit extending upwardly from the top of the tank and an inner tubular conduit extending freely through said outer conduit, both of said conduits opening at their lower ends into the interior of said tank;

a fill neck assembly comprising a housing having a lower end adapted to be sealingly received within the upper end of said outer conduit, means including a hollow tubular member on the lower end of said housing adapted to be sealingly received within the upper end of said inner conduit to defining a first passage extending upwardly through said housing to an inlet opening, sealing means for normally sealing said inlet opening and movable to an open position to accommodate the introduction of liquid fuel into said first passage through said inlet opening, means defining a second passage through said housing having an inlet at its lower end adapted to open into the upper end of said outer conduit and an outlet at one side of said housing, said first and second passages being isolated from uncontrolled communication with one another at said housing, normally closed first valve means operable in a first position to block flow of fluid through said second passage and shiftable to a second position placing said inlet and said outlet of said second passage in fluid communication with each other, and means responsive to movement of said sealing means to its open position for shifting said first valve means to its second position, said sealing means comprising annular seal means mounted in said housing between said inlet opening and said first passage adapted to slidably and sealingly receive a tubular fuel dispensing nozzle of standard diameter to accommodate the dispensing of liquid fuel from said nozzle into said first passage while maintaining said first passage sealed from the atmosphere, a hinged trap door plate mounted in said first passage adjacent said annular seal means for pivotal movement between a closed position in underlying sealing engagement with said annular seal means sealing said first passage from said inlet opening and an open position clear of said annular seal means, spring means biasing said plate to said closed position, said plate being movable to its open position by the insertion of said nozzle through said annular seal means, and lost motion coupling means coupling said plate to said first valve means for shifting said first valve means to its second position upon pivotal movement of said plate to its open position said first valve means including a valve head mounted in said housing for reciprocatory movement between said first and said second positions, and first spring means biasing said head to said first position, and said lost motion coupling means comprising a push rod mounted for reciprocatory movement in said housing and having rack teeth thereon, pinion means on said plate in mesh with said rack teeth to drive said rod in reciprocatory movement upon pivotal movement of said plate, said push rod being movable into engagement with said valve head after a predetermined movement of said plate from its closed position and operable upon further movement of said plate from its closed position to push said head toward its second position.

* * * * *